United States Patent Office 3,167,391
Patented Jan. 26, 1965

3,167,391
PURIFICATION OF ANHYDROUS
HYDROGEN FLUORIDE
Carl F. Swinehart, University Heights, Ohio, assignor to
The Harshaw Chemical Company, Cleveland, Ohio, a
corporation of Ohio
No Drawing. Filed July 18, 1963, Ser. No. 296,120
8 Claims. (Cl. 23—153)

This invention relates to the preparation of anhydrous hydrogen fluoride and more specifically to the preparation of high purity anhydrous hydrogen fluoride. The invention further relates to the preparation of electronic grade hydrofluoric acid.

The distillation of aqueous hydrogen fluoride to prepare a pure product is well known but little has been done to upgrade commercially acceptable anhydrous hydrogen fluoride to a product of extreme purity. Within the last few years the demand for anhydrous hydrogen fluoride of very high purity has increased tremendously, especially with the advent of the exploitation of nuclear energy. Exemplary of such use is the preparation of uranium, zirconium and beryllium fluorides which are of primary importance in the harnessing of nuclear energy, especially in the production of very pure uranium oxide for reactors.

The reaction vessels employed for the preparation of these compounds are usually composed of nickel or Inconel (nickel alloy). Because hydrogen fluoride is commonly prepared commercially from the mineral fluorspar, sulfur impurities such as sulfur dioxide ($SO_2$) and sulfur trioxide ($SO_3$) and phosphorus impurities such as $P_2O_5$ (which reacts with $H_2O$ and HF) are generated in minor amounts with hydrogen fluoride and are uniformly present in commercial grade hydrogen fluoride. The nickel or Inconel containers which are used as reaction vessels for the preparation of uranium, zirconium and beryllium fluorides are rapidly corroded interstitially at the high reaction temperature if there is any combined or free sulfur in the hydrogen fluoride and it is therefore expedient that this element (sulfur) particularly be removed. In order ot reduce the rate of corrosion of the reaction vessels employed in the process of producing the fluorides for use in atomic energy, the U.S. Government has set up specifications requiring that the sulfur content of high purity anhydrous hydrogen fluoride be at a minimum and the water concentrations be maintained below .04 percent by weight.

Such high purity anhydrous hydrogen fluoride may be produced by passing a commercial grade hydrogen fluoride gas over argentic fluoride which removes water and sulfur impurities (see for example U.S. Patent No. 2,526,585) or by electrolyzing potassium hydrogen fluoride to remove water and subsequently fusing the product and distilling highly pure hydrogen fluoride therefrom (see J. H. Simon, Fluorine Chemistry, Academic Press Inc. Publishers, New York, 1950, p. 227). However, these procedures are too expensive to be used as a practical procedure for the production of high purity anhydrous hydrogen fluoride and much effort has been made to find a relatively low cost commercially feasible process.

The common and commercially feasible method of preparing hydrofluoric acid is carried out by treating fluorspar with concentrated sulfuric acid in a retort which is heated to temperatures of 150° C. to 300° C.

As the hydrogen fluoride gas along with the above mentioned impurities is generated, it is continually absorbed by the absorbing liquid which contains a very large percentage of hydrogen fluoride compared to that which can be absorbed in the residence time of the liquid through an absorbing zone. Conventionally the absorber liquid is channeled to a reboiler (distilling pot) where heat is applied by steam coils or the like. As gaseous hydrogen fluoride is driven off, the absorber liquid lowerd in concentration of HF is continually cycled back to absorb more crude HF.

It is common to include a certain percentage of sulfuric acid in the absorbing liquid for reducing the corrosiveness of aqueous hydrogen fluoride and also to control hydrogen fluoride-water azeotrope. Sulfur trioxide ($SO_3$) additions balanced with water additions conveniently control the concentrations of the sulfuric acid.

The hydrogen fluoride coming from the reboiler is then scrubbed with liquid hydrogen fluoride in one or more stages to remove residual water vapor and mist from the absorber liquid. As the gaseous hydrogen fluoride is being scrubbed, it gradually associates to form di-, tri- and tetramolecules of hydrogen fluoride (e.g., $H_2F_2$, $H_3F_3$ and $H_4F_4$). The scrubbed gas after condensation is then passed on to a stripper for substantial removal of any low boiling impurities present.

The resulting product from this commonly used process, while being perfectly acceptable as commercial grade, fails to meet the rigid specifications of purity necessary for use in atomic energy. Moreover, the product is not uniformly produced. Sometimes the product contains trace amounts of phosphoric acid. Other times the product contains only trace amounts of sulfuric acid or sulfurous acid. Sometimes silicon and boron are present in intolerable amounts.

It has now been discovered that the above-described process for preparing hydrogen fluoride from a reaction which produces phosphorus and/or sulfur impurities such as from the reaction of fluorspar with sulfuric acid can be modified to uniformly prepare high purity anhydrous or electronic grade hydrogen fluoride by continually adding water to the hydrogen fluoride scrubbing liquid in minor controlled amounts.

While the reasons for the surprising upgrading are not definitely known, a possible explanation is as follows.

The hydrogen fluoride which is distilled from an aqueous acid solution containing high boiling impurities especially those comprising hexavalent sulfur and pentavalent phosphorus are easily dehydrated when the residual water vapor is removed by scrubbing the distilled hydrogen fluoride gas with liquid anhydrous hydrogen fluoride. If these compounds are not prevented from being dehydrated, they form compounds which are more volatile than the hydrogen fluoride, escape through the scrubbing stages and go on to a stripping operation. If the water content in the reboiler liquid drops below about 10 percent, $P_2O_5$ in the hydrated form ($H_3PO_4$) dehydrates and reacts with the hydrogen fluoride to form the "low boiler," phosphoryl fluoride ($POF_3$); and if the sulfuric acid mists during the distillation, it is partially or completely dehydrated in the scrubbing to form ($SO_3$) and/or a sulfuryl fluoride. Further to being additional impurities, sulfur trioxide, sulfuryl fluoride, and phosphoryl fluoride react with water generated by sulfur dioxide after scrubbing but prior to or during the stripping of the hydrogen fluoride gas. If there are significant amounts of these impurities present when water is generated, they combine with water to form sulfuric acid and phosphoric acid respectively which, when formed at this point in the process, cannot be removed.

The impurities, particularly hexavalent sulfur compounds and pentavalent phosphorus compounds, become ionized in the scrubbing liquid and having very low vapor pressure are cycled back to the reboiler or absorber liquid and are consequently prevented from passing further into the system with the sulfur dioxide-containing hydrogen fluoride.

For the HF system conventional distillation procedures operated without control of the water content are limited in their ability to give an overall removal of phosphate, sulfate, etc. since the high boiling impurities escaping with the hydrogen fluoride become dehydrated to form compounds many of which are more volatile or lower boiling than the hydrogen fluoride. Sulfur dioxide ($SO_2$) which is a low boiler and is always present in the distilled hydrogen fluoride in small or trace amounts, by reacting with the metal walls of the reactor and/or hydrogen fluoride gas, generates small amounts of water in the product after it has been dehydrated substantially.

Not only is the generated water undesirable as a contaminant as such but it reacts with various low boiling impurities $POF_3$, $SO_3$ and the like which result from dehydration of high boiling impurities as $H_3PO_4$, $H_2SO_4$ and the like.

In addition to phosphorus and sulfur impurities, silicon, and boron are likely to be present in combined form as impurities in the generated gaseous hydrogen fluoride. These impurities are arbitrarily either classified as high boiling impurities or as low boiling impurities using the boiling point of HF, 19.4° C., as a division for the classification. Possible impurities which may be present in the crude hydrogen fluoride gas include some or all of the following:

| High Boiling | | Low Boiling | |
|---|---|---|---|
| $H_2SO_4$ | d 340° C. | $SO_2$ | −10° C. |
| $H_3PO_4$ | d 213. | $POF_3$ | −39.5 sublimes. |
| | | $SOF_2$ | −43.8. |
| $H_2PO_3F$ | >185 vac. | $SOF_4$ | −48.5. |
| $BF_3 \cdot 0.32HF \cdot 2.29H_2O$ | 170 azeotrope. | $SO_2F_2$ | −49.7. |
| $HSO_3F$ | 162.5. | $H_2S$ | −59.6. |
| $HPO_2F_2$ | 111. | $CO_2$ | −78 sublimes. |
| $H_2O \cdot 0.55HF$ | 112 azeotrope. | $HCl$ | −85. |
| | | $SiF_4$ | −95 sublimes. |
| $(CH_3)_2S$ | 37.3. | $BF_3$ | −101. |
| | | Air | −190. |
| | | $H_2$ | −253. |

The impurities designated both High and Low Boiling are carried off with the HF gas produced in a varying degree of contamination, depending on the amounts of impurities present in sulfuric acid and the extent of reaction with the apparatus.

No positive evidence for $SO_2F_2$ is found in the gases usually generated, but its formation under abnormal conditions is not out of the question. Even so, small amounts of hexavalent sulfur generally appear in the product, indicating volatilization as $HSO_3F$, $SO_3$, $SO_2F_2$, or $SOF_4$. None of the phosphorus compounds have been found to have a lower valence than +5.

The process of the present invention is advantageously carried out by contacting the impure HF gas with a series of liquid scrubbing media containing controlled amounts of water. The process starts with vapor wherein the HF to water ratio is from 19:1 to essentially anhydrous HF and contacting it a plurality of times with a scrubbing liquid containing from 1 part in 9 to 1 part in 500 of water (10 percent to 0.2 percent water by weight). The non-aqueous portion of the scrubbing liquid includes those impurities which are present within an HF generation system. Though the scrubbing liquids will be predominantly HF, they, in use, accumulate as much as two percent each of $H_2SO_4$ and $H_3PO_4$, 50 p.p.m. B, and .05% $SiF_4$, and still function well. The ratio of quantities of scrubbing liquid to HF associator gas employed is dependent on variables such as the type of equipment and operating temperatures. The optimum ratios, however, for any particular system are determinable by a skilled operator. Water concentration maintained at the aforementioned ratios will prevent volatilization of phosphate and yield a gas that, when condensed, contains as high boiling impurities less than 1 p.p.m. $PO_4^{-3}$, 1 p.p.m. $SO_4^{-2}$, 1 p.p.m. boron, and .012 percent $H_2O$.

The low boiling group of impurities, $SO_2$, $SiF_4$, HCl, $CO_2$, $H_2S$, etc. can then be stripped down to a low concentration range without limiting complications.

Also, the fugacity of the high boiler impurities in ion form is so small that without chemical conversion to low boilers only one or two theoretical plates can reduce their concentration in the product far more effectively than a very large number of plates in expelling the low boiler dehydrating products, even if there was not some reversal by the chemical reactions with traces of water set free from dehydration of $SO_2$ or reactions of it with the metal containers. Though all the compounds referred to here are well known, the conversions and the way in which they limit the purification by distillation have not previously been recognized despite the fact that many millions of pounds of HF have been processed. Not only is the control of the water content an important feature in the process, but the product from it can be of far better quality than from other known processes. The range of ratios in which water holds or suppresses the vaporization of sulfate, phosphate, and certain other impurities is less than 500 parts by weight of HF to 1 part of $H_2O$. HF to water ratios of the distilled hydrogen fluoride gas much below 19:1 are not of interest in the production of anhydrous hydrogen fluoride unless the sulfuric acid exceeds 30 percent.

The major contaminant removed by the process of this invention is phosphorus in the form of $PO_4^{-3}$ ion and $POF_3$. Substantially all phosphate ion will remain in the absorbing liquid (acid in HF system which is not being treated for removal of impurities other than air) where over 10 percent $H_2O$ is present. $POF_3$, however, cannot be removed and is retained in the associator gas (gas in the HF system which is being treated for removal of high boiling impurities) when less than 0.2 percent $H_2O$ is present in the scrubbing liquid. The term "scrubbing liquid" as used herein defines liquids containing certain critical amounts of water which are contacted with associator gas in order to purify the gas. The reactions taking place within the system are as follows:

$$PO_4^{-3} + 3H_2F^+ \to H_3PO_4 + 3HF$$
$$H_3PO_4 + HF \to H_2PO_3F + H_2O$$
$$H_2PO_3F + HF \to POF_3 + H_2O$$

Removal of $POF_3$ from HF associator gas is effected by contacting the impure HF gas with scrubbing liquids containing water in quantities greater than 0.2 percent, the reaction probably being as follows:

$$POF_3 + 2H_2O \to H_2PO_3F + 2HF$$

$H_2PO_3F$ is a high boiling ionizable impurity and will thus be removed from the HF gas.

Control of the water content in the plates will suppress the phosphorus, that, heretofore, was present as a volatile compound, so that they are retained in the liquid phase as ionized fluophosphates and can be easily removed from the system. At the low water contents which would naturally prevail in the column, phosphoric acid or fluophosphoric acid are converted to the gaseous $POF_3$; thus, any that leaves the reboiler goes on to contaminate the product. Reflux tends to dry the column, defeating rather than aiding phosphate removal. With water added to the column, $POF_3$ formation is suppressed. Borates and sulfates behave in like manner.

Substantially all of the phosphate leaves the retort, as $POF_3$, passing to reboiler or absorber liquid acid where it accumulates. As long as at least 10 percent to 18 percent $H_2O$, depending on the impurities, is present in the absorber or reboiler liquid the $H_3PO_4$ remains behind; but if the water content is lowered, such as for example by sulfur trioxide ($SO_3$) coming over to the reboiler, $POF_3$ again is formed, this time in higher concentrations which, though it may go on to tail, also puts troublesome traces in the product. Regulating the water concentration in the absorber or reboiler liquid so that it is maintained at a concentration of at least about 10 percent and preferably at least about 18 percent is considered to be the preferred form or mode of the present invention. It is to be understood by those skilled in the art that the water content should not exceed concentrations which would produce an azeotrope with the hydrogen fluoride and/or the sulfuric acid present in the absorber liquid. In the preferred form of this invention, substantially no $POF_3$ passes into the associator gas stages so all of the phosphate leaving the retort remains in or is returned to the absorber liquid and does not reach the product.

The HF product produced by the process of this invention may be controlled within limits such that there is less than 1 p.p.m. of boron present, less than 1 p.p.m. phosphorus expressed as phosphate present, less than 1 p.p.m. hexavalent sulfur expressed as sulfate present, less than 20 p.p.m. of sulfur dioxide and less than 0.1 percent water.

The following description of the flow sheet which will clarify various embodiments of the invention is given for purposes of illustration and is not to be considered as limiting the spirit and scope of the invention.

Example

HF gas (containing above mentioned impurities) from retorts reacting fluorspar and sulfuric acid is absorbed in the absorber unit by a mixture of $H_2SO_4$ (56.4%), $H_2O$ (25.6%) and HF (18%) which flows countercurrent to the gas. The resulting liquor then flows to the reboiler where essentially anhydrous HF gas (plus volatile impurities—$SO_2$, $SiF_4$, $POF_3$, $SO_3$, etc.) is released by heat and passed through a two-plate fractionating tower. The first plate liquid concentration is maintained at 96.5% HF and 3.5% $H_2O$ by the addition of water directly to the plate. The HF gas containing 0.07 $H_2O$ in equilibrium with the liquid on Plate No. 1, then passes to Plate No. 2 where the concentration is maintained at 99.65% HF and 0.35% $H_2O$ by the further addition of water to this plate. HF gas containing 0.01% $H_2O$ or less in equilibrium with the liquid on Plate No. 2 then flows from the tower at 20° C. to a condenser where the resulting liquid then flows to storage for further purification. The concentration of $H_2O$ on the plates is determined by conductivity readings on a cell positioned in the liquid of each plate.

Liquid feed of essentially anhydrous HF is introduced on Plate No. 2 from the condenser and is of the same composition as the liuqid that flows to storage prior to entering the stripping apparatus for $SO_2$ and $SiF_4$ removal. At this point the liquid will test less than 1 p.p.m. $PO_4^{-3}$, 1 p.p.m. $SO_4^{-2}$, 1 p.p.m. B, and .01 percent $H_2O$. After stripping, the water content may rise to .02 percent but the $SO_2$ and $SiF_4$ can easily be reduced to under 10 p.p.m. each and HCl to less than 1 p.p.m. without change in the $PO_4^{-3}$, $SO_4^{-2}$ and B contents.

Reboiler liquid which has been depleted of dissolved HF is circulated back to the absorber tower after passing through a heat exchanger to cool to the required temperature. Any increase of water content in the reboiler liquid is converted to sulfuric acid by the addition of $SO_3$ to the stream flowing back to the absorber tower. The volume of this liquor is kept constant by continuous removal of a portion which also removes phosphorus which has been retained in the liquid phase.

It should be understood that water content can be controlled by appropriate use of that water which is already within the HF generation system as well as by addition from an external source of water. Water content in the associator apparatus is conveniently measured and regulated by conductivity cells. The conductivity cells can be used to regulate the reflux or feed back of scrubbing liquid, thereby controlling the water ratio, or they may be used to determine the injection of water from an external source.

If excessive amounts of water are added to the scrubbing liquid, the water content of the distilled hydrogen fluoride may not be reduced sufficiently but the other impurities will be held back. As long as there is no more than 5 percent by weight water in the scrubbed product, it is considered to be outside of the range of water concentrations where the hydrogen fluoride is referred to as aqueous hydrogen fluoride. It is within the scope of the present invention to prepare such products wherein they have reduced amounts of phosphorus and sulfur even though they have excessive water (up to 5 percent).

Moreover, it is within the scope of the present invention to add a further scrubbing step using anhydrous liquid hydrogen fluoride to reduce as far as possible the water content in the hydrogen fluoride gas. Once the phosphorus and sulfur impurities have been removed by the initial scrubbing, the water content in the product can be reduced below 0.02 percent by the additional scrubbing.

Use of all types of liquid gas contacting devices is considered as being within the scope of this invention. Liquid-gas contacting devices which have been found to be especially suitable for purposes of this invention are scrubbers, packed columns and bubble cap columns.

This application is a continuation-in-part of application Serial No. 140,847, filed September 26, 1961, and now abandoned.

It is to be understood that the present invention includes all of the embodiments thereof falling within the scope of the appended claims and is not to be limited by the specific embodiments set forth above.

What is claimed is:

1. In a process for the purification of anhydrous hydrogen fluoride from the reaction between sulfuric acid and fluorspar comprising effecting said reaction to produce free gaseous hydrogen fluoride, absorbing said hydrogen fluoride gas in an aqueous acid solution, heating said solution containing the absorbed hydrogen fluoride gas to distill said gaseous hydrogen fluoride containing impurities comprising water vapor, pentavalent phosphorus compounds and hexavalent sulfur compounds and contacting said hydrogen fluoride gas with a scrubbing liquid consisting essentially of liquid hydrogen fluoride, the improvement comprising continually adding liquid water to said scrubbing liquid to maintain the water concentration between 1 part by weight water to 9 parts by weight hydrogen fluoride and 1 part by weight water to 500 parts by weight hydrogen fluoride whereby to retain said phosphorus and said sulfur in said scrubbing liquid and to reduce the phosphorus content and the sulfur content of said gaseous hydrogen fluoride and to recover substantially pure anhydrous hydrogen fluoride.

2. The process of claim 1 wherein said acid solution comprises at least 10 percent by weight water.

3. The process of claim 1 wherein said acid solution comprises sulfuric acid and at least about 18 percent by weight water.

4. The process of claim 1 wherein said scrubbing liquid comprises from about .35 percent by weight water to about 3.5 percent by weight water.

5. The process of claim 1 wherein said gas is contacted with a second scrubbing liquid comprising from about 0.2 percent to about 0.35 percent by weight water and is passed through a stripper to recover anhydrous hydrogen fluoride.

6. In a process for purification of anhydrous HF in order to reduce the concentration of sulfur and phosphorus impurities present only in trace amounts, comprising the steps of: (a) absorbing a high purity vapor phase hydrogen fluoride into a liquid phase mixture of $H_2SO_4$, $H_2O$ and HF, phosphoric acid and traces of other impurities, (b) $H_2O$ being present to the extent of at least 10 percent to 18 percent, based on the weight of said liquid phase (c) and phosphoric acid being present but not above 2 percent in said liquid phase, the balance being substantially all HF and $H_2SO_4$ (d) heating said liquid phase to drive off a second vapor phase containing hydrogen fluoride and water in concentration ratio from 19 to 1 to essentially anhydrous, (e) passing said second vapor phase in contact with a scrubbing liquid comprising liquid water and hydrogen fluoride wherein said liquid water is added continually to maintain the water to hydrogen fluoride concentration ratio of 1 to 9 to 1 to 500, and (f) recovering from the resulting material a more highly purified anhydrous hydrogen fluoride whereby said sulfur and phosphorus impurities are retained in said scrubbing liquid.

7. In a process for the purification of anhydrous hydrogen fluoride gas from hydrogen fluoride gas having a hydrogen fluoride to water concentration of from 19 to 1 to essentially anhydrous and containing pentavalent phosphorus impurities comprising passing said gas through at least one scrubbing stage wherein said gas is scrubbed with liquid anhydrous hydrogen fluoride the improvement water to retain said phosphorus impurities in said scrubbing liquid at least at one of said stages to maintain the water concentration between 1 part by weight water to 9 parts by weight hydrogen fluoride and 1 part by weight water to retain said phosphorus impurities in said scrubbing liquid and to 500 parts by weight hydrogen fluoride whereby to reduce the phosphorus content of said gas and to recover substantially pure anhydrous hydrogen fluoride.

8. In a process for the purification of hydrogen fluoride which comprises generating free gaseous hydrogen fluoride, absorbing said hydrogen fluoride gas in an aqueous acid solution, heating said solution containing the absorbed hydrogen fluoride gas to distill said gaseous hydrogen fluoride containing impurities comprising water vapor, pentavalent phosphorus compounds and hexavalent sulfur compounds and contacting said hydrogen fluoride gas with a scrubbing liquid consisting essentially of liquid hydrogen fluoride, the improvement comprising continually adding liquid water to said scrubbing liquid to maintain the water concentration between 1 part by weight water to 9 parts by weight hydrogen fluoride and 1 part by weight water to 500 parts by weight hydrogen fluoride whereby to retain said phosphorus and said sulfur in said scrubbing liquid and to reduce the phosphorus content and the sulfur content of said gaseous hydrogen fluoride and to recover substantially pure anhydrous hydrogen fluoride.

References Cited by the Examiner

UNITED STATES PATENTS

| | | | |
|---|---|---|---|
| 2,507,605 | 5/50 | Lopker | 23—153 |
| 2,690,815 | 10/54 | Calfee et al. | 23—153 X |
| 2,846,290 | 8/58 | Yacoe | 23—153 |
| 3,004,829 | 10/61 | Boyle et al. | 23—153 |

FOREIGN PATENTS 289,383  7/29  Great Britain.

MAURICE A. BRINDISI, *Primary Examiner.*

UNITED STATES PATENT OFFICE
CERTIFICATE OF CORRECTION

Patent No. 3,167,391

January 26, 1965

Carl F. Swinehart

It is hereby certified that error appears in the above numbered patent requiring correction and that the said Letters Patent should read as corrected below.

Column 2, line 2, for "lowerd" read -- lowered --; column 5, line 47, for "liuqid" read -- liquid --; column 7, lines 11 to 26, claim 7 should appear as shown below instead of as in the patent:

> 7. In a process for the purification of anhydrous hydrogen fluoride gas from hydrogen fluoride gas having a hydrogen fluoride to water concentration of from 19 to 1 to essentially anhydrous and containing pentavalent phosphorus impurities comprising passing said gas through at least one scrubbing stage wherein said gas is scrubbed with liquid anhydrous hydrogen fluoride the improvement comprising continually adding liquid water to said scrubbing liquid at least at one of said stages to maintain the water concentration between 1 part by weight water to 9 parts by weight hydrogen fluoride and 1 part by weight water to 500 parts by weight hydrogen fluoride whereby to retain said phosphorus impurities in said scrubbing liquid and to reduce the phosphorus content of said gas and to recover substantially pure anhydrous hydrogen fluoride.

Signed and sealed this 13th day of July 1965.

(SEAL)
Attest:

ERNEST W. SWIDER
Attesting Officer

EDWARD J. BRENNER
Commissioner of Patents